United States Patent Office
3,641,037
Patented Feb. 8, 1972

3,641,037
CYCLIC SUBSTITUTED DERIVATIVES OF
TRICYCLOHEXYLTIN
Donald E. Bublitz, Concord, Calif., assignor to The Dow
Chemical Company, Midland, Mich.
No Drawing. Filed Sept. 20, 1968, Ser. No. 761,309
Int. Cl. C07f 7/22
U.S. Cl. 260—270                                  7 Claims

ABSTRACT OF THE DISCLOSURE

Cyclic substituted derivatives of tricyclohexyltin wherein the cyclic substituent is selected from furyl, pyridyl, indenyl and pyridylethyl, said derivatives being useful as pesticides.

---

The present invention relates to novel and useful cyclic substituted derivatives of tricyclohexyltin wherein the cyclic substituent is selected from furyl, pyridyl, indenyl or pyridylethyl. These compounds are representable by the following Formula I:

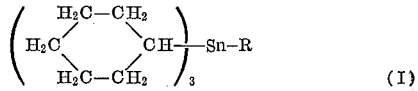  (I)

In this and succeeding formulas, R is 2-furyl, 2-pyridyl, 3-pyridyl, 1-indenyl, or 2-(2-pyridyl)ethyl.

In the present specification and claims 2-furyl denotes the

group; 2-pyridyl, the

group; 3-pyridyl, the

group; 1-indenyl, the

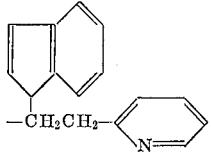

group; and 2-(2-pyridyl)ethyl, the group.

The compounds of the present invention are crystalline solids at room temperature. They are useful as pesticides for the control of a wide variety of pests such as arachnid, fungal, plant, and insect organisms, for example, mites, ticks, the causative agents of apple scab and potato late blight, pigweeds, bindweed, worms, flies, beetles, and roaches. They are particularly useful as acaricides for the control of mites and ticks.

Compounds of the present invention wherein R is other than 2-(2-pyridyl)ethyl are prepared by reacting together tricyclohexyltin chloride and an organolithium compound of the Formula II:

Li—R'    (II)

in which R' is 2-furyl, 2-pyridyl, 3-pyridyl, or 1-indenyl. The reaction proceeds smoothly at temperatures at which lithium chloride of reaction is liberated, and conveniently at temperatures of from about −50° C. to about 100° C. The reaction is conducted in inert anhydrous organic liquid reaction medium. Suitable media include the common organic solvents or mixtures thereof such as ether, tetrahydrofuran, hexane, benzene, toluene, and the like. The amounts of the reactants employed are not critical, some of any of the desired products being formed when employing any proportions of reagents. However, the reaction consumes the reagents in the proportion of one mole of tricyclohexyltin chloride per mole of organolithium compound and the employment of such proportions is usually preferred. The reaction is conducted under anhydrous conditions and, preferably, substantially to completion under a dry, inert atmosphere such as argon, nitrogen, and so forth.

In conducting the reaction, the tricyclohexyltin chloride and Li—R' compound are contacted with one another in a liquid reaction medium in any convenient order or fashion. In a preferred manner, the tricyclohexyltin chloride is added to the Li—R' reactant dispersed in the liquid reaction medium. The reaction mixture is then maintained within the given temperature range for a period of time sufficient to complete the reaction. The reaction mixture is then conventionally processed to separate and isolate product. Such processing includes filtration, extraction, distillation, chromatography, and the like.

The 2 - (2 - pyridyl)ethyl tricyclohexyltin compound hereof is prepared by reacting together tricyclohexyltin hydride and 2-vinylpyridine. The reaction proceeds at temperatures of from about 0° C. to about 150° C. or more. Liquid reaction medium such as can be provided by the common organic solvents or mixtures thereof such as ether, tetrahydrofuran, hexane, benzene, toluene, and the like can be employed. The amounts of the reactants employed are not critical, some of any of the desired products being formed when employing any proportions of reagents. However, the reaction consumes the reagents in the proportion of one mole of tricyclohexyltin hydride per mole of 2-vinylpyridine compound and the employment of such proportions is usually preferred.

In conducting this reaction, the tricyclohexyltin hydride, 2-vinylpyridine, and liquid reaction medium, if employed are brought together in any convenient order or fashion and then maintained within the given temperature range for a period of time sufficient to complete the reaction. The reaction mixture is then conventionally processed to separate and isolate product. Such processing includes filtration, extraction, distillation, chromatography, and the like.

The following examples illustrate the present invention but are not to be construed as limiting.

EXAMPLE 1

2-furyltricyclohexyltin

The 2-furyl lithium salt is prepared by reacting furan with n-butyllithium. In such operations, n-butyllithium (10.2 grams; 0.159 mole) dispersed in 100 milliliters of n-hexane is added portionwise with stirring at room temperature to 7.3 grams (0.11 mole) of furan dispersed in 30 milliliters of dry diethyl ether. Stirring is thereafter continued at room temperature for 12 hours to insure completion of the reaction. Tricyclohexyltin chloride (8.0 grams; 0.020 mole) dispersed in 100 milliliters of dry toluene is added with stirring at room temperature to the above prepared reaction mixture containing the 2-furyl lithium salt. This addition is carried out over a period of 30 minutes. The resultant mixture is stirred for one hour at 35° C. and, following this, an ammonium chloride solution is added in order to decompose any excess lithium reagent remaining after the reaction. The organic phase is separated and evaporated leaving a white solid as residue. This residual solid is washed well with ethanol to remove tricyclohexyltin chloride. Following this washing, the residual white material is dried to give the desired 2-furyltricyclohexyltin product as a white solid melting at from 134°–138° C.

*Elemental analysis.*—Calculated for $C_{22}H_{36}SnO$ (percent): C, 60.7; H, 8.3. Found (percent): C, 60.56; H, 8.45. Infrared analysis supports the assigned structure.

EXAMPLE 2

2-pyridyltricyclohexyltin

Pyridine (1.66 grams; 0.0210 mole) is dispersed in 200 milliliters of dry toluene and the resulting dispersion added dropwise with stirring to 14 milliliters of a 1.5 N solution of n-butyllithium in hexane (0.021 mole of n-butyllithium) to prepare a mixture containing the 2-pyridyl lithium salt. The addition is carried out over a period of 30 minutes, and at a temperature of minus 35° C. While maintaining the temperature of the resultant mixture at minus 35° C., a solution of 8.0 grams (0.020 mole) of tricyclohexyltin chloride dispersed in 100 milliliters of dry toluene is added dropwise to the above prepared lithium salt over a 30 minute period. The resulting solution is stirred for two hours at the minus 35° C. temperature. The reaction mixture is then hydrolyzed with ammonium chloride solution to decompose any remaining lithium reagent and the organic phase separated. The organic phase is concentrated by evaporation to give a residual solid. This residual solid is washed well with ethanol and dried to obtain the 2-pyridyltricyclohexyltin product melting at from 173°–176° C. The product is identified by its infrared spectrum and nuclear magnetic resonance (NMR) data.

EXAMPLE 3

3-pyridyltricyclohexyltin

In a manner analogous to that set forth in the preceding Example 2, the 3-pyridyl lithium salt and tricyclohexyltin chloride are reacted together to obtain the 3-pyridyltricyclohexyltin product as a crystalline solid melting at 180° C. The product is identified by its infrared spectrum and nuclear magnetic resonance data.

EXAMPLE 4

1-indenyltricyclohexyltin

The 1-indenyl lithium salt is prepared by dispersing 5.3 grams (0.046 mole) of indene in 200 milliliters of dry tetrahydrofuran and, while maintaining the resulting solution under a dry nitrogen atmosphere at room temperature, adding thereto 28 milliliters of a 1.5 N n-butyllithium (0.042 mole) in hexane solution in a dropwise fashion. This addition is conducted with stirring and over a period of 5 minutes. Following the addition, the mixture is stirred at a temperature of 67° C. for four hours to insure completion of the reaction. Tricyclohexyltin chloride (16.0 grams; 0.0396 mole) dispersed in 100 milliliters of tetrahydrofuran is thereafter added to the above prepared mixture containing the lithium salt. The addition is carried out under a nitrogen atmosphere and at a temperature of 56° C. Following the addition, the reaction mixture is kept at this temperature with stirring for 12 additional hours to insure completion of the reaction. It is then hydrolyzed with ammonium chloride solution and the reaction medium concentrated by evaporation to obtain a residual solid. This solid is washed well with ethanol and dried to obtain the 1-indenyltricyclohexyltin product as a solid melting at from 112°–115° C. Identification of the product is provided by its infrared spectrum and nuclear magnetic resonance data.

EXAMPLE 5

2-(2-pyridyl)ethyltricyclohexyltin

Tricyclohexyltin hydride (7.4 grams; 0.020 mole) and 2-vinylpyridine (2.8 grams; 0.026 mole) are mixed together at room temperature with stirring. The resulting mixture is heated to 100° C. and thus maintained with stirring for 10 hours. At the end of this time, the reaction mixture is transferred to a vacuum line and the volatile materials removed with gradually decreasing pressures down to about 0.2 millimeter Hg over a one hour period to obtain the desired 2-(2-pyridyl)ethyltricyclohexyltin product having a molecular weight of 474.3. The identity of the product is established by its infrared spectrum and nuclear magnetic resonance data.

The compounds of the present invention are useful as pesticides for the control of a wide variety of household and agricultural pests such as arachnid, fungal, plant and inspect organisms as, for example, mites, ticks, *Bacillus subtilis*, bread mold fungus, pigweeds, Daphnia, worms, and flies. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative operations, each of 3-pyridyltricyclohexyltin, 1-furyltricyclohexyltin, and 1-indenyltricyclohexyltin gives complete controls and kills of two-spotted spider mites when the latter are separately contacted with compositions containing, as the sole toxicant, one of the named compounds at a concentration of 500 parts per million by weight.

In further representative operations, 3-pyridyltricyclohexyltin, 2-(2-pyridyl)ethyltricyclohexyltin and inden-1-yltricyclohexyltin give substantially complete controls and kills of *Staphylococcus aureus*, when each are spearately employed as the sole toxicant in aqueous compositions at concentrations of 500 parts per million by weight.

In still further operations, 3-pyridyltricyclohexyltin gives substantially complete controls and kills of each of Cabomba and milfoil when applied at a concentration of 20 parts per million by weight to the aqueous environment supporting such life.

Further, 2-pyridyltricyclohexyltin gives good controls and kills of mouse tapeworm and pig ascarids when incorporated at a concentration of 0.1 percent by weight into the diets of mice infested with such organisms.

The products employed as starting materials as herein described are prepared via known methods. Tricyclohexyltin chloride can be prepared by the Grignard reaction of cyclohexylmagnesium halide and tin tetrachloride. Tricyclohexyltin hydride is prepared by reducing tricyclohexyltin chloride in organic reaction medium and at temperatures of from about minus 10° to 110° C., using lithium aluminum hydride.

What is claimed is:

1. The compound corresponding to the formula

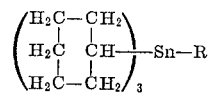

wherein R represents 2-pyridyl, 3-pyridyl or 2-(2-pyridyl)-ethyl.

2. The compound claimed in claim 1 wherein R is 2-pyridyl.

3. The compound claimed in claim 1 wherein R is 3-pyridyl.

4. The compound claimed in claim 1 wherein R is 2-(2-pyridyl)ethyl.

5. The compound claimed in claim 1 wherein R is 2-pyridyl or 3-pyridyl.

6. The compound claimed in claim 1 wherein R is 2-pyridyl or 2-(2-pyridyl)ethyl.

7. The compound claimed in claim 1 wherein R is 3-pyridyl or 2-(2-pyridyl)ethyl.

References Cited

UNITED STATES PATENTS

| | | | |
|---|---|---|---|
| 3,269,904 | 8/1966 | Bernstein et al. | 260—270 X |
| 3,321,480 | 5/1967 | Schröder et al. | 260—270 |
| 3,321,481 | 5/1967 | Schröder et al. | 260—270 |

ALEX MAZEL, Primary Examiner

J. H. TURNIPSEED, Assistant Examiner

U.S. Cl. X.R.

260—346.1, 429.7; 424—263, 285, 288